Feb. 20, 1968  H. J. BUNCH  3,369,824
BELL-CRANK SPRING-SUSPENSION SYSTEM FOR WHEELED VEHICLES
Filed May 3, 1966  4 Sheets-Sheet 1
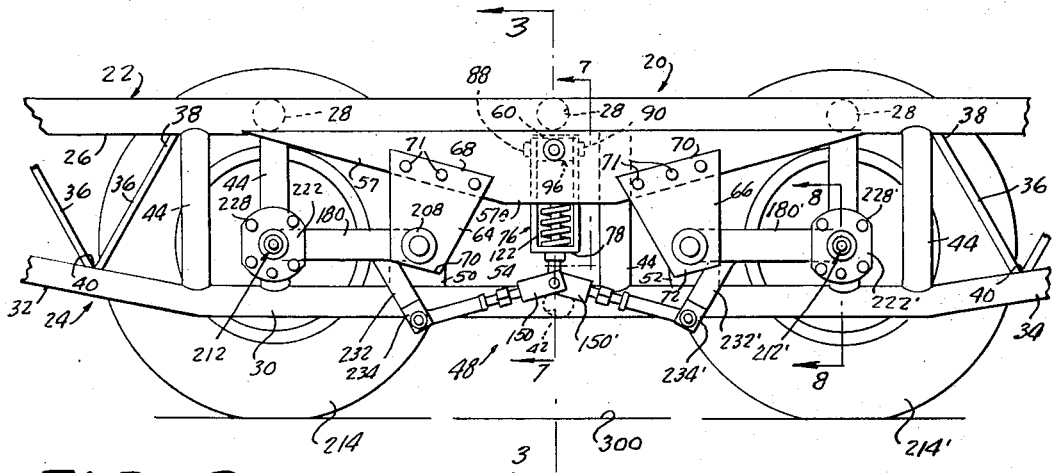
FIG. 1.
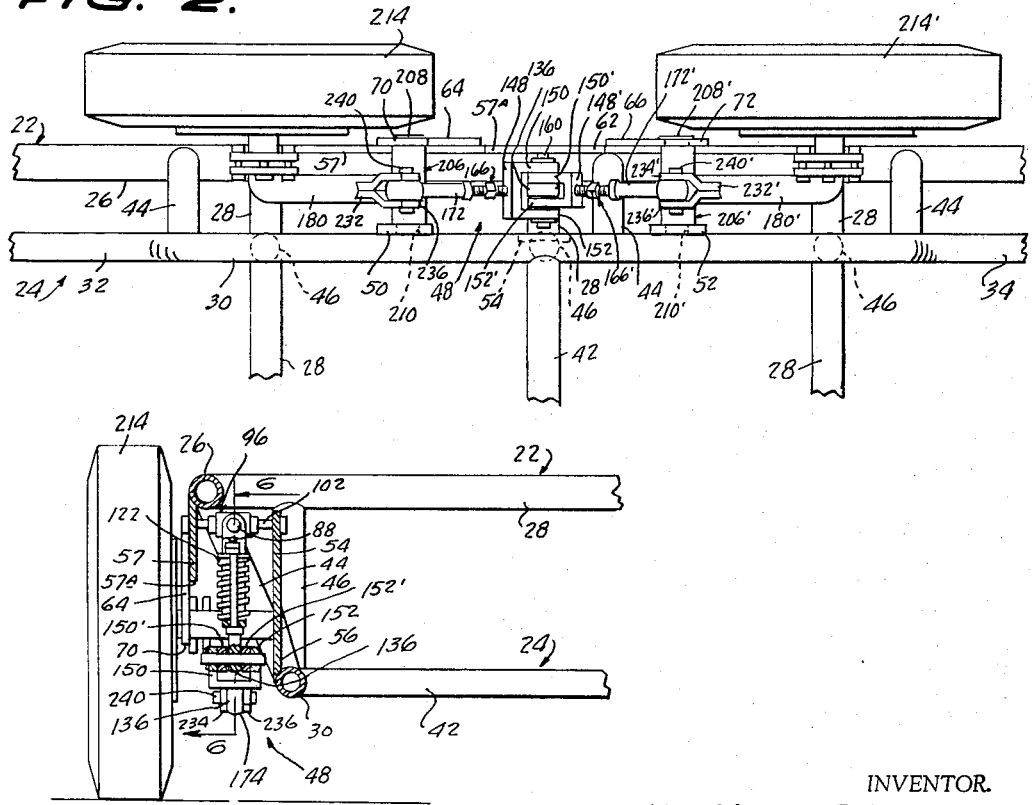
FIG. 2.
FIG. 3.
INVENTOR.
HARRY J. BUNCH,
BY
Berman, Davidson & Berman
ATTORNEYS.

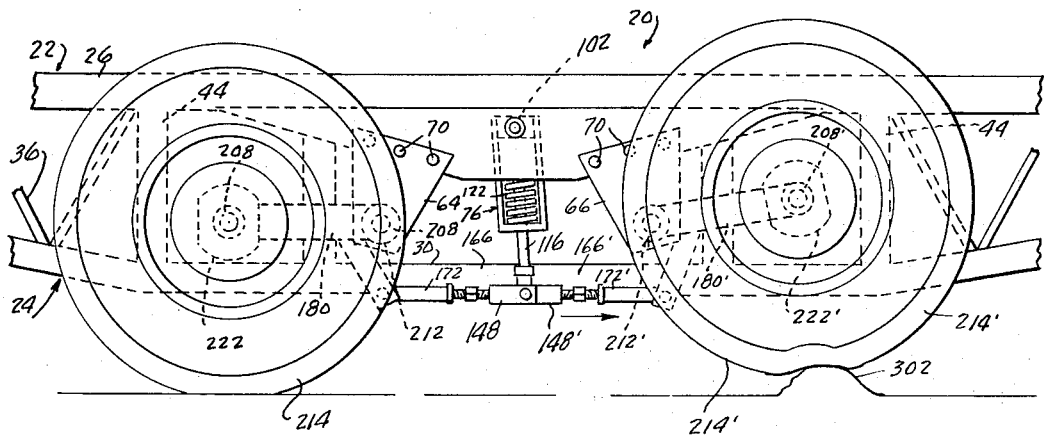
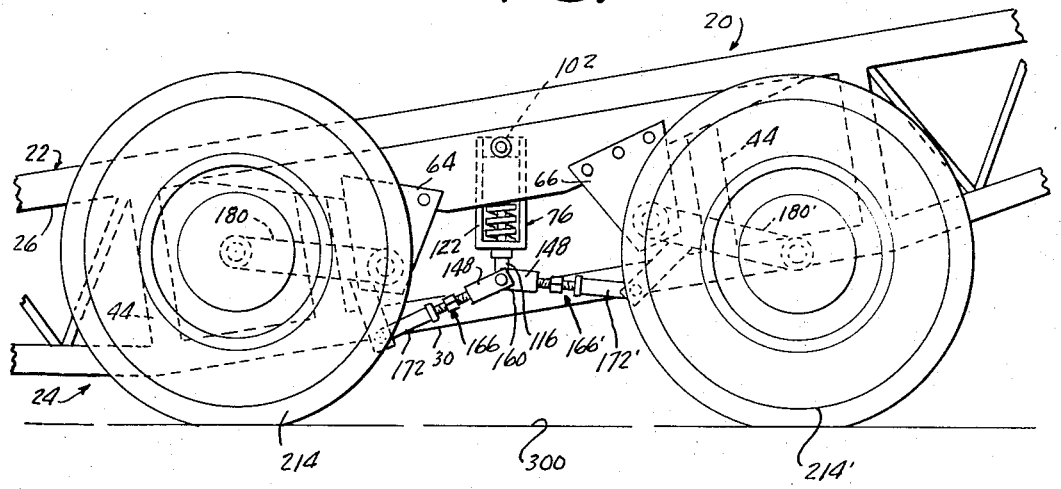

Feb. 20, 1968 H. J. BUNCH 3,369,824
BELL-CRANK SPRING-SUSPENSION SYSTEM FOR WHEELED VEHICLES
Filed May 3, 1966 4 Sheets-Sheet 3
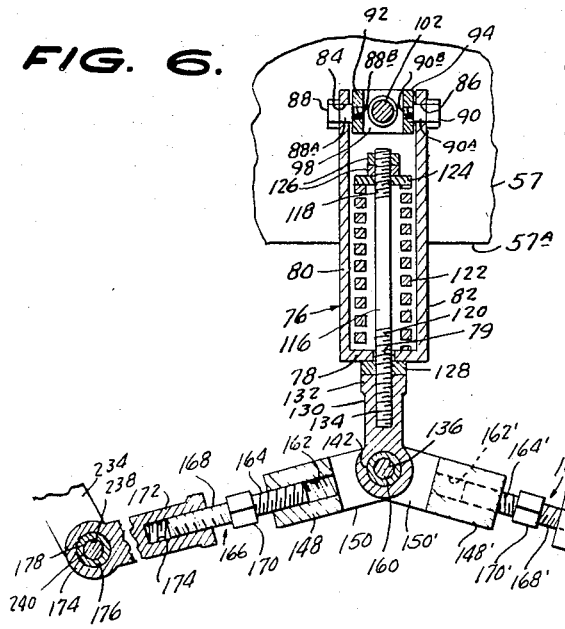
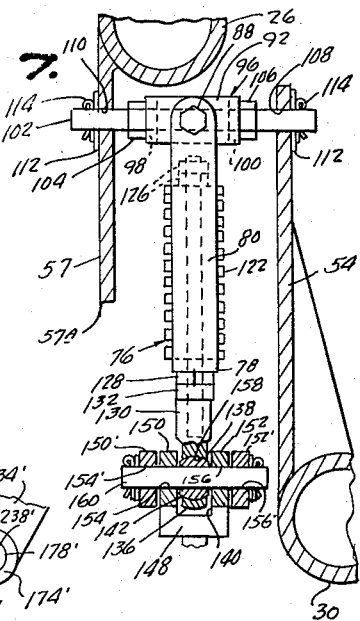
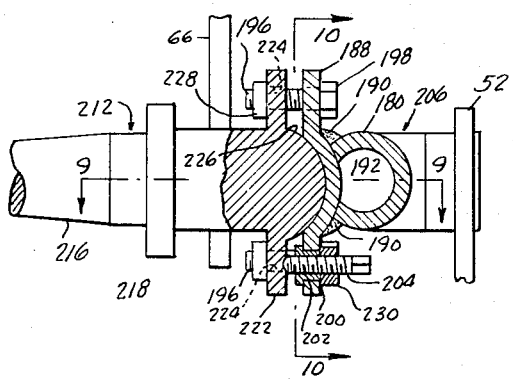
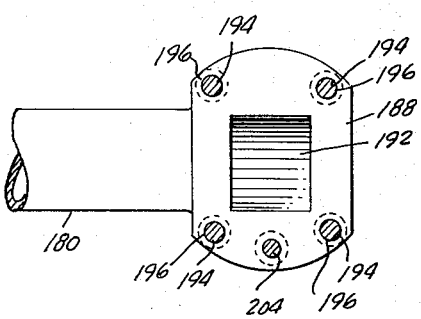
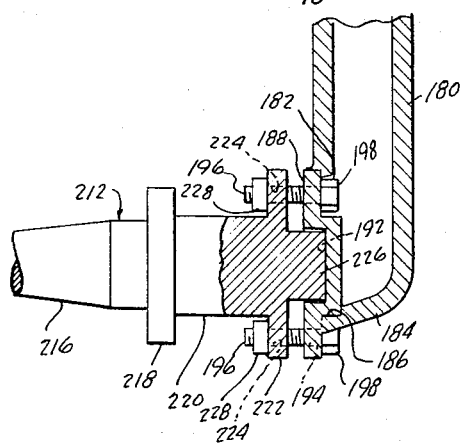
INVENTOR.
HARRY J. BUNCH,
BY
Berman, Davidson & Berman
ATTORNEYS.

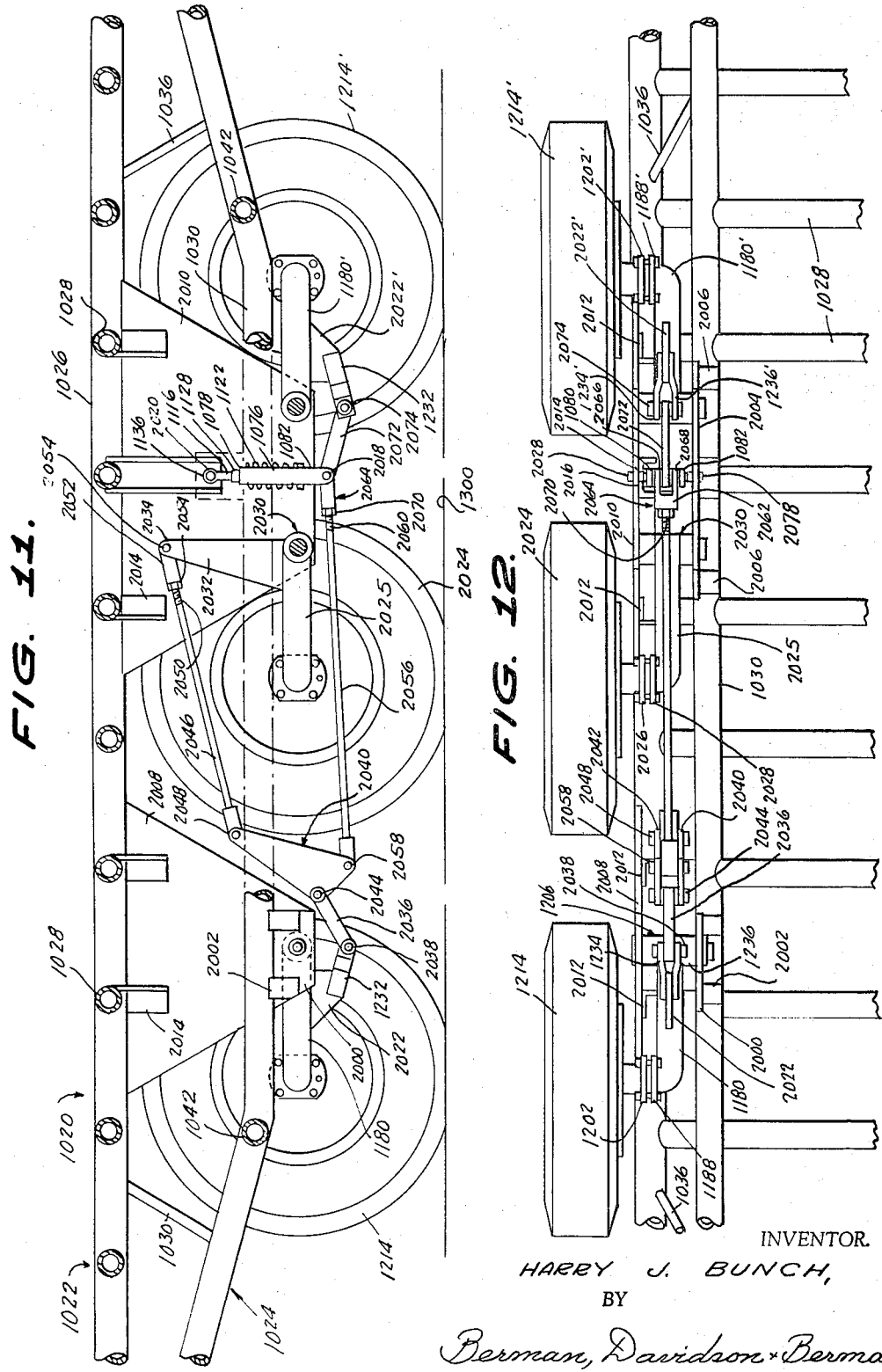

3,369,824
BELL-CRANK SPRING-SUSPENSION SYSTEM FOR WHEELED VEHICLES
Harry J. Bunch, 1108 Clay Ave., Louisville, Ky. 40219
Filed May 3, 1966, Ser. No. 547,202
7 Claims. (Cl. 280—104.5)

This invention relates to the general field of suspension means or systems for land vehicles and, more specifically, the invention relates to a mechanical device of the bell-crank lever type, and including resilient means for maintaining the vehicle chassis in a comparatively level or horizontal position regardless of the physical contour of the terrain being traversed by the vehicle.

The present invention recognizes that our present high-speed highways and modern roads are being subjected, increasingly, to the transportation of heavy loads which aside and apart from the load weight, per se, severely damages such highways or roads due to the failure of the vehicle suspension means to provide suitable control to prevent or absorb vibration, fore-and-aft pitching and lateral sway. With respect to the problem of the transport of heavy loads, present-day suspension systems are generally too hard in the sense that road shocks are transmitted through the alleged suspension or shock-absorbing means directly to the vehicle chassis and thence to the load to the ultimate damage thereof or, the vehicle suspension means are frequently found to be too soft thereby permitting pitch and lateral sway to take place and run rampant.

Still further, conventional vehicle suspension means are not designed to operate at their optimum when the vehicle is moved under full-load and no-load conditions. In the suspension systems according to the prior art, adjustable means have been provided in an attempt to meet full-load and no-load conditions, but for the most part, suspension systems which provide for this type of adjustability are merely compromises rather than actual solutions to the involved problem.

While thhe paragraphs immediately above point out the detrimental effect occasioned to roads and transported goods as a consequence of poor or improper vehicle suspension means, inherent with these problems is the consequence of road shock to the transportation vehicle and the ever-present danger of lack of control of the vehicle by the operator as a consequence of the vehicle pitch or sway.

These problems and others interrelated therewith have long been recognized by those persons engaged in the land transport of material and personnel, and a solution thereto was presented in my United States Patent No. 3,071,267, which issued on Jan. 1, 1963, and was entitled "Hitch and Trailer Having Improved Wheel Suspension of the Tandem Type." A similar disclosure is found in my copending application filed Nov. 15, 1963, Ser. No. 324,006 and being entitled, "Tractor-Trailer Hitch."

The instant invention constitutes an improvement over the disclosures of the patent and application, supra.

While this invention is described and illustrated with specific reference to land vehicle trailers of the type specifically designed for transporting heavy loads or implements such as, for example, earth-working machines and the like, to those skilled in this art it will be instantly recognized that the invention will find equal application to land vehicles of other types and designs.

As had been indicated above, one of the primary objects of this invention is to maintain a land-vehicle trailer in a level position during its movement, and in particular, to solve the difficult task of maintaining the trailer chassis in a substantially horizontal position when the trailer is moving across comparatively rough terrain which contemplates the entry of the trailer into fields, rough excavations, as well as over unimproved roads for the express purpose of loading or unloading objects to be transported by the trailer.

While this may be considered as, perhaps, one of the broadest objects of this invention, a similar, but not less important object thereof is to provide a land vehicle of the trailer type constructed to handle heavy loads over particularly rough terrain and wherein the trailer is provided with an improved wheel suspension of the tandem type, In accordance with the invention, the improved wheel suspension has been specifically designed to permit relative vertical movements of the several wheels in response to the terrain being traversed, without disturbing the desired level position of the trailer while it is in transport toward its destination.

While in the objects noted above stress has been placed upon the maintenance of the vehicle body or chassis in a substantially level position, it is to be here understood that the suspension means is of such design as to permit the vehicle wheels to move relative to a normally horizontal chassis or vehicle bed in such a manner as to prevent the vehicle bed to move out of a selected horizontal plane. That is, the important object of this invention is to preclude vertical movement and oscillation of the vehicle chassis in response to shocks imparted to the vehicle wheels.

Other and further objects and advantages of the instant invention will become more manifest from a consideration of the following specification when read in conjunction with the annexed drawings, in which:

FIGURE 1 is a fragmentary side elevational view of a tandem-wheeled trailer chassis together with the suspension means according to one embodiment according to this invention installed thereon;

FIGURE 2 is a fragmentary bottom plan view of the chassis and suspension means as shown in FIGURE 1;

FIGURE 3 is a fragmentary detail cross-sectional view, FIGURE 3 being taken substantially on the vertical plane of line 3—3 of FIGURE 1, looking in the direction of the arrows;

FIGURE 4 is a side elevational view, similar to FIGURE 1, and showing the relative positions of the component elements of the suspension system as the vehicle wheel encounters a raised portion in the path being traveled by the vehicle;

FIGURE 5 illustrates the relative position of the suspension means when the chassis of the vehicle has been pivoted to a position to receive or discharge goods from the vehicle bed;

FIGURE 6 is an enlarged detail cross-sectional view, FIGURE 6 being taken substantially on the vertical plane of line 6—6 of FIGURE 3, looking in the direction of the arrows;

FIGURE 7 is a detail cross-sectional view, partly in side elevation, of the suspension means, FIGURE 7 being taken substantially on the line 7—7 of FIGURE 1, looking in the direction of the arrows;

FIGURE 8 is an enlarged fragmentary detail cross-sectional view, FIGURE 8 being taken substantially on the vertical plane of line 8—8 of FIGURE 1, looking in the direction of the arrows;

FIGURE 9 is a fragmentary detail cross-sectional view, FIGURE 9 being taken substantially on the horizontal plane of line 9—9 of FIGURE 8, looking in the direction of the arrows;

FIGURE 10 is a fragmentary detail cross-sectional view, FIGURE 10 being taken substantially on the vertical plane of line 10—10 of FIGURE 8, looking in the direction of the arrows;

FIGURE 11 is a fragmentary cross-sectional view of a three-wheeled tandem-suspension device according to a second embodiment of this invention; and FIGURE 12 is a bottom plan view of the suspension means shown in FIGURE 11.

Referring now more specifically to FIGURES 1 to 10, inclusive, of the drawings, reference numeral 20 designates, in general, a chassis for a tandem-wheeled trailer which is adapted to be drawn by a conventional tractor or truck (not shown). In the several figures of the drawings, the chassis 20 is only fragmentarily shown, the representation thereof being limited only to the extent required to lend intelligence to the present invention. For a more complete description of the chassis 20, reference is made to my Patent No. 3,071,267.

Briefly sketching the more salient features of the chassis 20, the same is seen to comprise an upper substantially open rectangular frame 22, and a lower similar frame 24. The frames 22, 24 are normally horizontal, are vertically spaced from one another, and are constructed, in the main, of hollow tubular elements of which the upper frame 22 includes a pair of hollow cylindrical, laterally spaced, elongated substantially parallel side frame members 26 (only one being shown in several figures) which are connected at each adjacent pair of ends thereof to the opposed ends, respectively, of similarly constructed and arranged end frame members, none of the latter being illustrated inasmuch as the frame construction is well-known in this art. To provide sufficient rigidity for the frame 24, a plurality of substantially parallel hollow cylindrical cross-frame members 28 are utilized, the latter having their respective opposed ends fixedly-secured to the side frame members 26, the cross-frame members 28 being longitudinally spaced relative to the side frame members 26.

The open lower frame 24 includes a pair of elongated hollow cylindrical side frame members 30 (again, only one being shown) the opposed ends of which are bent upwardly to form outer end portions 32, 34, and the outer terminal ends of the latter are fixedly secured to the end frame members (not shown) at points spaced inwardly from the opposed ends of the latter. It will be understood, from a consideration of FIGURES 1 to 3, inclusive, that the side frame members 30 are spaced inwardly from the side frame members 26 and extend parallel thereto. As is in the case of the chassis construction shown in my Patent No. 3,071,267, the lower frame 24 is subtended from the upper frame 22 by zigzag arrangement of a plurality of downwardly and inwardly converging struts 36 having their respective ends welded or otherwise fixedly secured to the side frame members 26 as at 38, and their respective lower ends similarly connected to the side frame extended portions 32, 34 as at 40. Preferably, one or more cross-frame members 42 extend transversely between the side frame members 30 and have their opposed ends rigidly secured thereto by conventional means.

The construction of the chassis 20 departs from the teachings of my prior Patent No. 3,071,267 in that additional bracing means is provided through the hollow tubular cylindrical side brace members 44 having their respective upper ends fixedly secured to the side frame members 26 and their respective other ends converging downwardly for rigid connection to the side frame members 30; and, in the further provision of a plurality of normally upright hollow tubular cylindrical brace members 46 having one of their respective ends fixedly connected to each cross-frame member 28 adjacent each respective end of the latter, and with the other ends of the former being rigidly secured to the side frame members 30 at longitudinally spaced intervals thereon.

The suspension means to which the subject matter of this invention is directed is assigned the general reference numeral 48 and is seen to comprise a back hanger bracket system which includes a pair of flat upright standards 50, 52 having their respective lower ends rigidly connected to each side frame member 30 at longitudinally spaced intervals thereon, and a flat upright standard 54 disposed intermediate the standards 50, 52 with its lower end also connected to the side frame members 30 as at 56. The invention also employs a front hanger system comprising a flat elongated inverted pyramidal plate 57 for each side frame member 26, the plates 57 having their respective bases welded or otherwise fixedly connected at 58 to their associated side frame member 26. The standards 50, 52, 54 and the plate 57 of the hanger bracket system at one side of the chassis 20 confront and are parallel to their respective counterparts at the other side of the chassis, and it will be further understood that the standards 50, 52, 54 are parallel to and are spaced inwardly from the immediate adjacent one of the plates 57. For reasons to become apparent infra, it is essential that the upper end 60 of the standard 54 be substantially above the lower end or skirt portion 57A of the plate 57. The front hanger bracket system also includes a pair of identically-formed flat trapezoidal plates 64, 66, there being one pair of such plates for each of the plates 57. The plates 64, 66 are longitudinally spaced from one another with respect to their associated plate 57 leaving the depending skirt portion 57A free and unencumbered therebetween. The other ends 72, 74 of the plates 64, 66 depend from their associated plate 57 in spaced parallel and confronting relation relative to the immediate adjacent ones of the standards 50, 52.

Reference numeral 76 denotes a substantially open U-shaped frame disposed in an upright position (see FIGURES 1 and 6), the frame 76 including a bight portion 78 having a central aperture 79 and an upright arm 80, 82 at its respective ends. The arms 80, 82 are parallel and confront one another and are apertured at 84, 86 adjacent their upper ends to receive transversely therethrough bolts, 88, 90, respectively. As is seen in FIGURE 6, the bolts 88, 90 are formed with cylindrical surfaces 88A and 90A on a central shank portion thereof, these cylindrical surfaces being journaled in the apertures 84, 86.

The inner ends 88B, 90B of the bolts 88, 90 are threaded into the adjacent sides of a pair of longitudinally extending substantially rectangular side frame members 92, 94, respectively, of an open substantially rectangular box-type frame 96 (see FIGURES 1, 3 and 7), the adjacent pairs of ends of the side frame members 92, 94 being connected by rectangular end frame members 98, 100.

An elongated substantially cylindrical shaft 102 extends through suitable apertures formed in the end frame members 98, 100 to swingably support the box-type frame 96 and its connected U-shaped frame member 76 for movement about its longitudinal or horizontally extending axis. The opposed ends of the shaft 102 project beyond the remotely disposed sides of the end frame members 98, 100, and axial shifting of the box-type frame 96 relative to the shaft 102 is prevented by the stop collars 104, 106 which are rigidly secured to the shaft 102 by conventional means (not shown) adjacent the end frame members 98, 100, respectively. The opposed ends of the shaft 102 are journaled for rotation in apertures 108, 110 which extend transversely through the plates 54, 57, respectively. Axial shifting of the shaft 102 relative to the plates 54, 57 is prevented by the shaft-mounted washers 112 and the adjacent cotter pins 114.

Reference numeral 116 designates an elongated bolt having threaded ends 118, 120. The threaded end 120 (see FIGURE 6) extends through the aperture 79 and the other end 118 thereof extends upwardly above the bight portion 78 between the arms 80, 82 and is surrounded by a helicoidal spring 122 having an end abutting the bight portion 78 and its other end abutting a discoidal cap plate 124 carried on the threaded end 118 and held in position by tension-adjusting nuts 126. A tension-adjustment nut 128 is also threaded on the threaded end 120 of the shaft 116, and following this nut 128 downwardly on shaft 116 is an axially elongated boss 130 having a wrench head 132 integrally formed therewith and internally threaded as at 134 (see FIGURE 6) to receive the threaded end 120 of the shaft 118 therein. The lower end of the boss 130 continues into an open annular eye-terminal end 136 having a continuous inner arcuate concave socket 138 formed therein (see FIGURE 7) which receives the convex outer side 140 of a ring 142.

Reference numerals 144, 146 indicate, in general, a pair of clevis-type links including, respectively, a bight 148, 148' from the remotely disposed ends of which upwardly extend side arms 150, 150', and 152, 152'. As is seen in FIGURE 7, the upper ends of the arms 150, 152 are embraced between the arms 150' and 152' and the upper ends of the arms 150, 152, 150', 152' are bored at 154, 156, 154', 156', respectively. The bores 154, 156, 154', 156' are aligned with one another and are aligned with the inner opening 158 which extends transversely through the eye 136, the bores and opening receiving a cylindrical shaft 160 therethrough.

Each bight portion, 148, 148' is internally-threaded at 162, 162', respectively, to adjustably-receive therein the threaded inner ends 164, 164', of a pair of cylindrical tongues 166, 166' having outer threaded ends 168, 168' of opposite hand. The tongues 166, 166' between their threaded ends 164, 168 and 164', 168' are integrally-connected with enlarged wrench heads 170, 170'.

Reference numerals 172, 172' denote elongated bosses identically constructed with respect to the boss 130, the bosses 172, 172' being internally-threaded at 174, 174' at one of their respective ends, and integrally formed at their other ends with annular eyes 174, 174' which receive in their respective transversely extending inner openings 176, 176' rings 178, 178' identically constructed with respect to the ring 142. The bosses 130, 172, 172' are identical in mechanical construction as stated above, with the exception that the bosses 172, 172' have a somewhat longer longitudinal body portion than the boss 130.

Reference numerals 180, 180' denote a pair of hollow tubular cylindrical wheel-supporting members, the wheel-supporting members being identical in construction. Through reference to FIGURES 8 to 10, inclusive, it is seen that one end of the wheel-supporting member 180 is cut-out (see FIGURE 9) as at 182 and is provided with an end closure wall 184 extending transversely thereacross. The end closure wall 184 is provided with a rabbet 186 confronting the edge of the cut-out 182 to receive a normally upright substantially rectangular back plate 188 therein which is fixedly secured thereon as by welding 190. The central portion of the back plate 188 is inwardly bowed, that is, formed with an expressed concave-convex wall 192 which extends inwardly in the direction of the wheel-supporting member 180 with the curvature thereof being formed about a normally horizontal axis. The back plate 188 is suitably apertured at 194 adjacent the four corners thereof to receive therethrough the shank portions 196 of the bolts 198, and the back plate 188 centrally of the lower end thereof is formed with a transversely extending opening 200 (see FIGURE 8) which carries an internally threaded bushing 202 and in which is mounted the externally threaded set screw 204.

Each of the wheel-supporting members 180, 180' is integrally connected to a hollow tubular cylindrical crosshead 206, 206', respectively, centrally of the ends thereof, the axes of the crossheads 206, 206' and their associated wheel-supporting members 180, 180' being at right angles relative to one another. The opposed ends 208, 210 and 208', 210' of the crossheads 206, 206', respectively, are journaled, by conventional means, for swinging movement in the adjacent hanger plate 64 proximate its lower end 70, the upper end of the plate 50, and the lower end 72 of the plate 66 and its adjacent plate 52, respectively, leaving the aforementioned one end of the wheel-supporting members 180, 180' free to swing about the horizontal axis of its associated crosshead 206 or 206'.

Reference numerals 212, 212' denote the wheel axles for a pair of tandem wheels 214, 214', each axle having the usual cone-shaped outer wheel hub-receiving shank 216 and stop collar 218 (see FIGURE 8). The inner end 220 of each axle is integrally formed with an outwardly-flaring substantially rectangular front plate 222 apertured as at 224 adjacent each corner thereof to receive the shanks 196 of the bolts 198 therethrough. The inner terminal end 226 of each axle 212, 212' has a substantially convex configuration complementing the curvature of the concave side of the wall 192 in which it is adjustably seated.

As is clearly seen in FIGURE 8, nuts 228 are mounted on the bolts 198 to detachably connect the axles 212, 212' with their respective wheel-supporting members 180, 180', and the adjustment of the set screw 204, which has its inner end bearing against the front plate 22 adjacent the lower end thereof, provides camber adjustment for each wheel 214, 214'. Lock nut 230 threaded on the set screw 204 maintains the adjustment in cooperation, of course, with the nuts 228 which must be loosened and re-tightened for each adjustment for camber correction.

Each of the wheel-supporting members 180, 180' has fixedly connected to the underside thereof one end of a depending elongated lever 232, 232' that extends below and in the direction of its associated crosshead 206, 206'. The other end of each lever 232, 232' is bifurcated to provide pairs of arms 234, 236 and 234', 236', respectively, between which is engaged the eye-terminal ends 174, 174' of the links 166, 166'. The arms 234, 236, 234', 236' are suitably apertured and aligned with the openings 238, 238' of the rings 178, 178' to receive connecting pins 240, 240' therethrough to provide a pivotal connection between the levers 234, 234' and their immediately adjacent bosses 172, 172'.

The above description relates to the independent wheel suspension of a pair of trailer tandem wheels which is duplicated, it will be understood, on each side of the vehicle.

It will be recalled that one of the primary objects of this invention is to provide suspension means for a wheeled-trailer which will permit the chassis of the trailer to maintain a substantially horizontal position relative to a normal ground plane and without the permission of material variations, vertically, in the plane of the horizontal chassis relative to the ground plane. Thus, and referring to FIGURE 1 of the drawings, the pair of tandem-disposed wheels 214, 214' are shown as engaging a substantially horizontal ground plane 300, and the suspension means has been adjusted, for example, to accept the full load on the chassis 20. The component elements of the suspension means assume their relative positions as is illustrated in FIGURE 1, under these conditions. The wheel-support member 180' will pivot upwardly about the horizontal axis of the crosshead 206' in a counterclockwise direction and will cause the lever 232' to turn in the same direction. This movement will effect a forward movement of the link 166' in the direction of the arrows shown in FIGURE 4, and will cause, simultaneously therewith, a pivotal movement in a counterclockwise direction of the U-shaped open frame 76, its associated bolt 116 and connected boss 130. This same movement will tend to effect a compressing action on the spring 122 which is, of course, resisted by the tension placed thereon, and at the same time, the link 166 will tend to pivot in a clockwise direction about the shaft 240 until the links 166, 166' are moved the maximum distance to effect coincidence of their longitudinal axes as shown in FIGURE 4. It will be noted that as the movement of the wheel 214' in the counterclockwise direction described above takes place, the upper frame 22 and the lower frame 24 maintain their respective distances above the ground plane 300.

As soon as the wheel 214' regains the ground plane 300, the wheel 214' will return to its original position shown in FIGURE 1 aided by the tension of the spring 122.

In FIGURE 5 of the drawings is illustrated the relative positions of the component elements of the suspension system when the chassis 20 has been tilted to its loading or unloading position as disclosed in my above-referred to patent and patent application. The assumed positions for the loading or unloading of the chassis 20 correspond, exactly, to the condition which would obtain if the leading wheel 214' were to drop into a hole or other depression extending below the ground plane 300. Thus, it is seen from FIGURE 5 that as the wheel 214 moves downwardly relative to the top frame 22, it will turn about the horizontal axis of the crosshead 206' in a clockwise direction. The same movement is introduced into the lever 232' which pushes the link 166'. The link 166' cannot translate this movement to the bolt 116 since the nut 128 is normally in abutting relationship relative to the bight 78. However, the push is directed in such a manner as to cause the U-shaped frame 76 to pivot about the shaft 102 in a clockwise direction and pushes against the link 166 in such a manner as to cause the upper portion of the wheel 214 to extend to a greater degree above the top frame 22 than would be its usual position as shown in FIGURE 1.

In FIGURES 11 and 12 there is disclosed a second embodiment of the wheel-suspension means wherein the basic principle of this invention has been applied to a three-wheeled tandem trailer. Since many of the component elements of the suspension means described above and illustrated in FIGURES 1 to 10, inclusive, find their counterparts in the embodiment disclosed in FIGURES 11 and 12, the same reference numerals have been employed to identify corresponding elements except that in the invention of FIGURES 11 and 12, the common elements have been increased by one thousand and elements new to the combination will originate with the number two thousand. Thus, and referring specifically to FIGURES 11 and 12, reference numeral 1020 designates the trailer chassis having an upper frame 1022 and a lower frame 1024.

In this embodiment of the invention the hanger bracket assembly differs somewhat in construction and is seen to comprise a rear longitudinally extending standard 2000 having an upper edge thereof rigidly secured, as by welding, to the underside of the longitudinally extending side frame members 1030. Reinforcing struts 2002 are employed, the struts 2002 having one of their respective ends connected to the standard 200 and their other ends rigidly connected with the side frame member 1030. A second standard 2004 forming a part of the back hanger plate assembly has its upper edge fixedly secured to the longitudinally extending side frame member 1030 and is reinforced by means of struts 2006. The standards 2000, 2004 are longitudinally aligned with one another and are spaced from one another.

The front hanger bracket system includes the plates 2008, 2010 each of which has its upper edge fixedly secured to the longitudinally extending side frame member 1026, the other end thereof depending therefrom to the extent that they are disposed in laterally spaced and confronting relationship relative to the immediately-adjacent standards 2004. As is seen in FIGURES 11 and 12, the plates 2008, 2010 are each reinforced by a plurality of angle members 2012 which are rigidly secured at their respective upper ends to the cross-frame members 2028 which the arms 2014 thereof being welded or otherwise rigidly secured in flush relation to the upper ends of the plates 2008, 2010.

Fixedly secured to one of the cross-frame members 1028 and depending therefrom is a channel member 2014 having a bight 2016 extending flush with the plate 2010 substantially centrally thereof, the channel member serving also to reinforce the plate 2010.

Reference numeral 1076 indicates an inverted substantially U-shaped frame having a bight portion 1078 provided with the central aperture (not shown) as before. Substantially upright arms 1080, 1082 depend from the opposed ends of the bight portion 1078, the arms 1080, 1082 being parallel and disposed in confronting relationship one to the other. The free ends of the arms 1080, 1082 support therebetween an elongated shaft 2018 to which further reference will be made infra.

As in the preceding embodiment, an elongated shaft 1116 having a stop nut 1128 mounted thereon is adapted for reciprocation through the bight portion 1078, and the other end of the shaft 1116 terminates in an eye 1136 mounted for swinging movement on a shaft 2020, the opposed ends of the latter extending through the bight 2016, plate 2012 and the standard 2004.

Reference numerals 1180, 1180' denote a pair of elongated wheel-support members each having crossheads 1206, 1206', the ends of the latter being journaled for rotation in the standard 2000, 2004 and their respective confronting plates 2008, 2010, and in the manner described above. The free ends of the members 1180, 1180' rotatably support the wheels 1214, 1214' and are connected thereto through the camber-adjustment plates 1188, 1202 and 1188', 1202', all as described supra.

Depending from each wheel-support member 1180, 1180' is a gusset plate 2022, 2022' to which is connected one end of the levers 1232, 1232' having arms 1234, 1236 and 1234', 1236', respectively, at their bifurcated ends.

The third wheel 2024 of the tandem arrangement at this side of the chassis 1020 is connected to the free end of a third wheel-support member 2025 identical to those described above, the connecting means including the same camber adjustment means as has been heretofore described, and includes, of course, the plates 2026, 2028 and the connecting means extending therebetween. The third wheel-support member 2025 also is provided with a crosshead 2030 of the type specified above, the crosshead 2030 having its opposed ends rotatably-journaled between the standard 2004 and the plate 2010. Fixedly secured to the support member 2025 adjacent the crosshead 2030 is a rigidly connected base end of an upwardly extending right-angular lever 2032 having an apex end 2034.

Reference numeral 2036 denotes an elongated link having an end thereof embraced between arms 1234, 1236 and connected thereon by means of a pivot pin 2038. At 2040 is designated a bell-crank lever comprising a pair of identically spaced and parallel side plates 2040 and 2042 which, at one end thereof which receive therebetween the other end of the link 2036 that is pivotally connected thereto by pivot pin 2044. A second end of the lever 2040 has secured between the plates 2040, 2042 one end of a link 2046 (see FIGURE 11), the connection being made through a pivot pin 2048. The link 2046 has its other end threaded at 2050 for threaded connection in one end of an extension member 2052, the link being held in its axially adjusted position relative to the extension member 2052 by means of a lock nut 2054, all in the conventional manner. The other end of the link extension 2052 is connected by a pivot pin 2054 to the apex end 2034 of the lever 2032.

The link 2056 has one of its ends pivotally connected on a pivot pin 2058 to the third end of the bell-crank lever 2040; the other end of the link 2056 is threaded as at 2060 for threaded-adjustment and connection in the bight 2062 of a clevis 2064 having arms 2066, 2068. Lock nut 2070 maintains the axial adjustment.

The arms 2066, 2068 are positioned between the lower ends of the arms 1080, 1082 and are pivotally connected thereon by the pivot pin 2018. The pivot pin 2018 also connects one end of the link 2072 between the arms 2066, 2068, the other end of the link 2072 being pivotally connected between the arms 1234', 1236' on a pivot pin 2074.

In FIGURE 12, the chassis 1020 is shown as operating over smooth terrain having a ground plane 1300. Assuming the chassis 1020 is moving from left to right in this figure, and that the leading wheel 1214' on the shown side of the chassis 1020 strikes a bump, the support member 1180' pivots in a counterclockwise direction pulling on link 2072 to cause the U-shaped frame 1076 to swing about the shaft 2020 in the same direction and to cause a compressive force to be exerted on the spring 1122. This tends to straighten the angle between the links 2056 and 2072, and in so moving, the bell-crank lever pivots about the pin 2058 tending to straighten the angle between the pins 2038, 2044 and 2058. As this movement takes place, the pivot pin 2048 will move downwardly and counterclockwise about the pin 2058 causing the lever 2032 to pivot in the same direction about the axis of the crosshead 2030 in order to turn the wheel 2024 downwardly about the same axis to compensate for the upward movement of the wheel 1214'. As the chassis continues its forward movement and in the aforesaid direction, the wheel 2024 will hit the bump, causing the wheel 2024 to turn clockwise, thereby turning the lever 2032 in the same direction. This pulls the link 2046 to the right as viewed in FIGURE 11, and as this action take place, it is seen that the angle between the pins 2038, 2044 and 2048 tends to assume a straight line thereby forcing the wheel 1214 downwardly to compensate for the upward movement of the wheel 2024. Under these conditions the link 2056 moves to the right tending to straighten the angle between the links 2056, 2072, but without moving the vertical position of the wheel 1214'.

Now, as the wheel 1214 engages the bump, the wheel 1214 pivots in a clockwise direction about its crosshead 1206 causing the angle between the pins 2038, 2044, 2058 to approach a straight angle, and as this movement takes place, the lever 2032 is pulled in a counterclockwise direction thereby forcing the wheel 2024 downwardly to compensate for the upward movement of the wheel 1214.

Having described and illustrated two embodiments of this invention in detail, it will be understood that the same are offered merely by way of example, and that this invention is to be limited only by the scope of the appended claims.

What is claimed is:

1. A suspension system for land vehicles having a chassis provided with a pair of opposed sides and ground-engaging means, said chassis being normally positioned substantially parallel to a horizontal ground plane and said ground-engaging means being disposed, respectively, on opposite sides of said chassis, said suspension system including means extending and connected between said chassis at each side thereof and said ground-engaging means, said last-named means comprising a pair of elongated members for each side of said chassis, each of said members having a pair of opposed ends, means connecting one end of each of said members with, respectively, one of said ground-engaging means, the other ends of said members converging toward one another and being pivotally connected on the immediately-adjacent side of said chassis, an inclined lever for each of said members, each of said levers having an end thereof fixedly connected to its associated member with the other ends of said levers at each side of said chassis extending toward one another and into proximity with respect to one another by linkage means, and substantially vertically disposed resilient means pivotally connected at one end with each pair of said proximate ends through said linkage means and being pivotally connected at the other end to the adjacent side of said chassis for swinging movement about a horizontal pivot axis, said resilient means constantly biasing said one end of said members for swinging movement in contra directions.

2. A tanden suspension for land vehicles as defined in claim 1, wherein said last-named connecting means includes means to adjust the camber of said ground engaging means.

3. A suspension system as defined in claim 1, wherein said ground-engaging means comprises a plurality of wheels for each side of said chassis and said means for connecting each of said wheels to its associated member includes an axle having a pair of opposed ends, each of said wheels being rotatably mounted, respectively, on one end of its associated axle, means connecting the other end of each of said axles with said one end of its associated member, and said resilient means including an open U-shaped frame having a bight and an arm projecting laterally from each end thereof, a bolt extending through said bight for reciprocation therethrough, a helicoidal spring surrounding one end of said bolt between said arms, one end of said spring being disposed in abutting relationship relative to said bight, a cap mounted on said bolt at said one end thereof and between said arms, the other end of said spring abutting said cap, a shaft extending transversely through said arms with its opposed ends pivotally supported on said chassis, stop means mounted on the other end of said bolt to limit its movement in one direction, and means pivotally connecting the proximate ends of said links to said other end of said bolt.

4. A suspension system for a wheeled land vehicle having a chassis and three wheels arranged in tandem at each side of said chassis, said system including an elongated wheel-supporting member for each of said wheels, means pivotally connecting one end of each of said members on said chassis with the other ends of a pair of adjacent pair of support members, said pair of support members extending in the same direction, the other end of the other of said support members extending in the opposite direction, an axle having a pair of opposed ends, there being one axle for each wheel, means rotatably-supporting said wheels on one end of their respective axles, means releasably connecting the other ends of said axles with, respectively, the other ends of said support members, a lever for the outermost ones of said support members, said levers each having an end fixedly connected to its associated said outermost ones of said support members with the other ends of said levers depending therefrom and extending toward one another, a first link having one of its ends pivotally connected to the other end of one of said levers, a lever having an end fixedly secured to the intermediate one of said support members and an opposed end projecting thereabove, a second link having an end thereof pivotally connected to the other end of said last-named lever, a bell-crank lever, means pivotally connecting the other ends of said first and second links with, respectively, two of the ends of said bell-crank lever, a third link having an end pivotally connected to the third end of said bell-crank lever, a fourth link having an end pivotally connected to the other end of the other of said levers, and resilient means pivotally connected with and extending between said chassis and the other ends of said third and fourth links.

5. A suspension system for a wheeled land vehicle as defined in claim 4, wherein said means for releasably connecting the other ends of each of said axles with their said supporting members includes wheel camber-adjusting means.

6. Camber-adjustment means for wheeled vehicles having a chassis, a plate for each wheel of said vehicle, said plate being fixedly secured to said chassis, said plate having a concave-convex socket formed therein with the concave side thereof facing outwardly of said chassis, an axle for each of said plates, said axle having a pair of opposed ends, one end of said axle rotatably supporting one of said wheels, the other end of said axle being convex and disposed within said concave side of said socket, said convex end of said axle and concave side of said socket mating with one another to permit angular vertical adjustment of said axle, a second plate rigidly secured to and having portions extending above and below said axle, and means extending and adjustably connecting said first plate with the upper and lower portions of said second plate whereby said upper and lower portions of said second plate may move alternately toward and away from said first plate to change the angle of inclination of said axle relative to a horizontal plane and thus adjust the camber of its associated wheel.

7. Camber-adjustment means for a wheeled vehicle as defined in claim 6, wherein said adjustable-adjusting means includes a plurality of bolts extending transversely through said first and second plates, and a nut for each of said bolts.

References Cited
UNITED STATES PATENTS

| | | | |
|---|---|---|---|
| 2,420,843 | 5/1947 | Shuey | 280—104.5 |
| 2,308,331 | 1/1943 | Heaslet | 280—104.5 |

LEO FRIAGLIA, *Primary Examiner.*

P. GOODMAN, *Assistant Examiner.*